US006755906B2

(12) United States Patent
Jorget et al.

(10) Patent No.: US 6,755,906 B2
(45) Date of Patent: Jun. 29, 2004

(54) PROCESS AND DEVICE FOR ELIMINATING HARMFUL VOLATILE ELEMENTS, IN PARTICULAR CHLORIDES AND/OR SULFATES, CONTAINED IN A STREAM OF PARTICLE-LADEN FUMES

(75) Inventors: Serge Jorget, Marcq-en-Baroeul (FR); Jean-Pierre Duda, Estevelles (FR)

(73) Assignee: FCB Ciment, Societe Anonyme, Villeneuve d'Ascq (FR)

( * ) Notice: Subject to any disclaimer, the term of this patent is extended or adjusted under 35 U.S.C. 154(b) by 158 days.

(21) Appl. No.: 10/025,441

(22) Filed: Dec. 19, 2001

(65) Prior Publication Data

US 2002/0083831 A1 Jul. 4, 2002

(30) Foreign Application Priority Data

Dec. 29, 2000 (FR) .............................................. 00 17292

(51) Int. Cl.⁷ ................................................. C04B 7/60
(52) U.S. Cl. ...................................... 106/752; 204/12.2
(58) Field of Search .......................... 106/752; 209/12.2

(56) References Cited

U.S. PATENT DOCUMENTS

| 3,365,521 A | * | 1/1968 | Brachthauser | 106/752 |
|---|---|---|---|---|
| 4,329,180 A | * | 5/1982 | Herchenbach et al. | 106/746 |
| 4,397,742 A | * | 8/1983 | Minnick | 210/716 |
| 4,469,664 A | * | 9/1984 | Abelitis et al. | 423/244.07 |
| 4,501,618 A | * | 2/1985 | Gebhard et al. | 106/705 |
| 4,555,252 A | * | 11/1985 | Eckstein | 96/67 |
| 4,634,583 A | * | 1/1987 | Wolter et al. | 423/244.07 |
| 4,695,325 A | * | 9/1987 | Enkegaard | 106/752 |
| 5,556,459 A | * | 9/1996 | Cohen et al. | 106/744 |
| 5,665,290 A | * | 9/1997 | Koslowski et al. | 264/669 |
| 6,183,244 B1 | * | 2/2001 | Doumet | 432/37 |
| 6,264,738 B1 | * | 7/2001 | Lorke et al. | 106/739 |
| 6,444,026 B1 | * | 9/2002 | Steffler et al. | 106/739 |
| 6,461,153 B2 | * | 10/2002 | Eckert et al. | 432/14 |

* cited by examiner

Primary Examiner—Donald P. Walsh
Assistant Examiner—Matthew J. Kohner
(74) Attorney, Agent, or Firm—Harrison & Egbert

(57) ABSTRACT

A process and a device for eliminating harmful volatile elements, in particular chlorides and/or sulfates, contained in a stream of particle-laden fumes, in which a given fraction of at least 5% of the fumes, referred to as 'by-passed fumes', is extracted. The harmful elements of the by-passed fumes are caused to condense, at least with regard to their particles, according to a distribution that is a function of the fraction extracted, and the particles are filtered to isolate the harmful elements. At the time of filtering, the particles are separated into at least two fractions, one with a fine grain size and the other with a coarse grain size, using a separation selectivity adapted to the distribution of the elements in order for the coarse grain size faction to be poor in harmful elements and for the fine grain size fraction to be rich in harmful elements. Application to the production of cement clinker, in particular Portland cement clinker.

9 Claims, 1 Drawing Sheet

PROCESS AND DEVICE FOR ELIMINATING HARMFUL VOLATILE ELEMENTS, IN PARTICULAR CHLORIDES AND/OR SULFATES, CONTAINED IN A STREAM OF PARTICLE-LADEN FUMES

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention relates to a process and to a device for eliminating the harmful volatile elements, in particular chlorides and/or sulfates, contained in a stream of particle-laden fumes, as well as to a use of said device in a plant for the production of cement clinker, in particular Portland cement clinker.

However, although more especially intended for such applications, the eliminating process and device according to the invention can also be used in all other fields in which it is wished to degas particle-laden fumes.

BACKGROUND OF THE INVENTION

At present, in the field of cement production, a very widely used manufacturing process consists in performing the following steps:

finely grinding the mixture of raw materials required, pre-heating the fines thus obtained in a cyclone exchanger to a temperature of between 800° C. and 900° C., firing the pre-heated material in a rotary tube furnace which heats said material to a temperature of over 1350° C.

The material leaving the furnace is known as clinker. This is then cooled down and crushed to produce the cement.

It will be appreciated that the above-described process consumes considerable energy and that it may be advantageous to minimize the heat input by supplying the fumes given off in the furnace to the cyclone exchanger in order to provide the pre-heating.

This being said, it can happen that the raw materials contain mineral compounds that are volatile at high temperatures, in particular chlorides and/or sulfates. In apparatus in which the temperature is high, a cycle is then produced: said compounds are volatilized in the hottest area of the furnace, close to the clinker output, and condense for the most part at between 700° C. and 950° C., that is to say in the lower part of the cyclone exchanger.

As a result, said compounds cannot leave the furnace, either with the hot clinker, since they are in a volatile state, or with the partially cooled final fumes, since they are then condensed and accumulate, reaching very high concentrations in the material and in the gases that circulate within the firing apparatus.

At the points of condensation, they can thus lead to the adhering of the materials in powder form to the walls of said apparatus and cause obstructions prejudicial to the satisfactory production.

One known method of eliminating these harmful elements is to effect purging at the point at which they are in a gaseous form, that is to say in the lowest part of the exchanger, as soon the fumes of the furnace have left the latter. Such purging is generally referred to as 'furnace fume by-passing' The proportion of fumes that has to be purged depends on the quantity of volatile compounds; it can represent over 50% in certain cases.

For this purpose, a part of the fumes are sucked off and cool air is injected into them. The very rapid cooling of the gases caused by mixing with the cool air causes the volatile elements to condense, on one hand in the form of very fine grains and, on the other hand, in the form of deposits on the surface of the grains of suspended materials that have been sucked off with the fumes. There are thus obtained by-pass dusts constituted by a mixture of the raw materials undergoing transformation and of said condensed harmful elements. The dust-laden gases are then filtered to retain the dusts contained in said harmful elements.

The by-pass dusts represent, however, a production loss as they contain a part of the raw materials. By way of example, a by-pass rate of 10% of the fumes can lead to a production loss of 1 or more percent.

Furthermore, the by-pass dusts represent a cost to the environment as there is, most often, no suitable means of treatment and the dusts have to be disposed of. They thus represent additional heat consumption since they have received the energy necessary to decompose the carbonates contained in the raw materials. There is thus much at stake financially in a reduction of their quantity.

One solution to reduce the quantity of lost materials is to separate the dusts into two fractions, a coarse fraction poor in harmful elements, which can be reintroduced into the clinker manufacturing circuit, and another fine fraction rich in harmful elements which is eliminated, or which is upgraded separately.

Hitherto, this solution was used only with small fume extraction rates, of less than 5%.

However, as already stated, the fume extraction rate can sometimes be well above 5% and no solution for recycling has been proposed to date in this case.

The difficulties to be overcome are indeed numerous. The lower the flow rate of fumes extracted, the more intense the cooling, and the greater the proportion in the by-pass dusts of fine grains constituted by condensates. On the other hand, in the case of high extraction rates, the distribution of the harmful elements in the dusts is more random. Furthermore, in such a case, it would not be economical to use a solution that would cause the dusts to be collected together in a group of heterogeneous grain size distribution such as, for example, such as cyclone exchangers.

The object of the invention is to propose a process and a device for eliminating the harmful volatile elements, in particular chlorides and/or sulfates, contained in a stream of particle-laden fumes, as well as the use of said device in a plant for producing cement clinker, in particular Portland cement clinker, which remedy the aforementioned drawbacks and permit the recycling of at least a part of the particles poor in harmful elements extracted to eliminate the volatile elements, in the case of processes involving a high fume extraction rate.

Further objects and advantages of the invention will emerge in the course of the description that follows, and which is given only by way of illustration and is not intended to limit it.

BRIEF SUMMARY OF THE INVENTION

The invention relates, first of all, to a process for eliminating the harmful volatile elements, in particular chlorides and/or sulfates, contained in a stream of particle-laden fumes, in which process there is extracted a given fraction of at least 5% of said fumes, referred to as 'by-passed fumes', the harmful elements of the by-passed fumes are caused to condense, at least with regard to their particles, according to a distribution that is a function of said fraction extracted, and said particles are filtered to isolate said harmful elements, characterized in that, at the time of filtering, said particles are separated into at least two fractions, one with a fine grain size and the other with a coarse grain size, using a separation selectivity adapted to said distribution of the harmful elements in order for said coarse grain size faction to be poor in harmful elements and for said fine grain size fraction to be rich in harmful elements.

The invention also relates to a device for eliminating the harmful volatile elements, in particular chlorides and/or sulfates, contained in a stream of particle-laden fumes, said device including means for extracting a given fraction of at least 5% of said fumes, referred to as by-passed fumes, means for condensing the harmful elements of the by-passed fumes at least with regard to their particles, according to a distribution that is a function of said fraction extracted, and means for filtering said particles to isolate said harmful elements, characterized by the fact that said filtering means include means for separating said particles into at least two fractions, one with a fine grain size and the other with a coarse grain size, said separating means having a selectivity adapted to said distribution of the harmful elements in order for said coarse grain size fraction to be poor in harmful elements and for said fine grain size fraction to be rich in harmful elements.

The invention further relates to the use of the device described above in a plant for producing cement clinker, in particular Portland cement clinker.

BRIEF DESCRIPTION OF THE SEVERAL VIEWS OF THE DRAWINGS

The invention will be more readily understood from a study of the following description, accompanied by annexed FIG. 1.

DETAILED DESCRIPTION OF THE INVENTION

Figure 1:
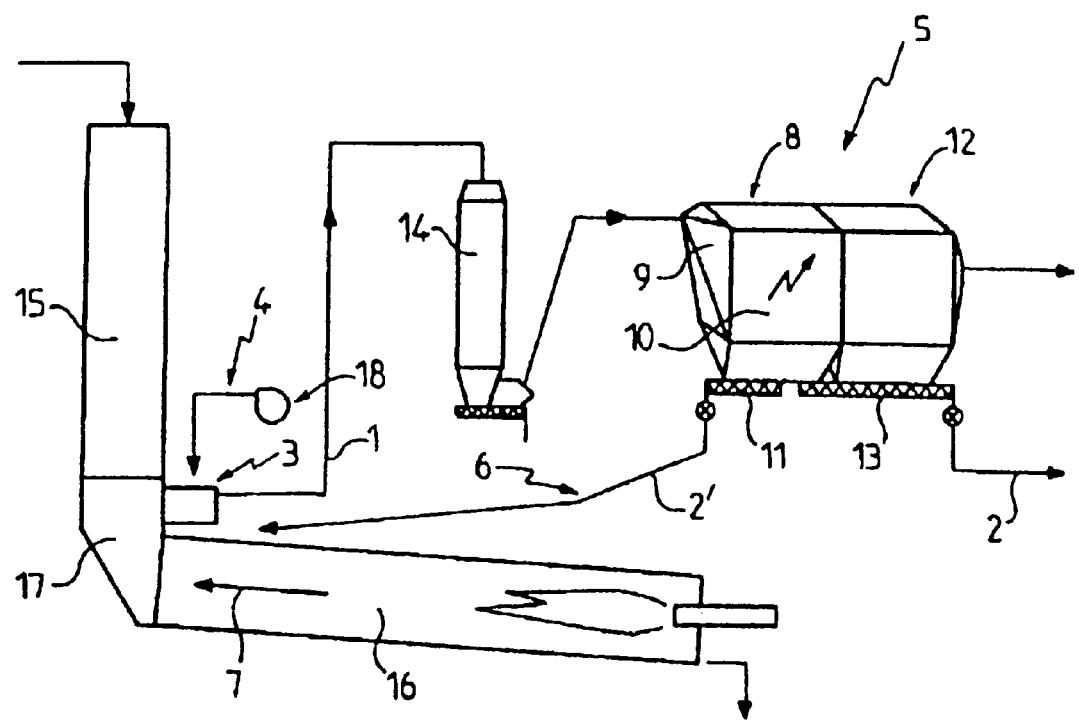
FIG. 1 is a diagrammatic illustration showing an example of a cement clinker production plant using the device according to the invention.

The invention relates, in the first place, to a process for eliminating the harmful volatile elements, in particular chlorides and/or sulfates, contained in a stream of particle-laden fumes.

As illustrated in FIG. 1, according to said process, a given fraction 1 of at least 5% of said fumes is extracted. Said fraction forms a stream of fumes, referred to as by-passed fumes, in which said harmful elements are present in gaseous form, and they are caused to condense, in particular by air cooling. Said harmful elements are then transformed into very fine grains and/or deposit in the area of said particles, according to a distribution that is a function of said fraction extracted. Said particles are then filtered in order to isolate said harmful elements.

It should be pointed out at this juncture that the word 'filtration' is to be taken as meaning an operation consisting in purifying a liquid or a gas and, in particular, in retaining the materials with which it is mixed or through which it is wished to pass it. It should further be pointed out that the word 'separation' is to be taken as meaning an operation consisting in separating elements of a heterogeneous mixture having, for example, particles of different sizes.

According to the invention, at the time of filtering, said particles are separated into at least two fractions, one with a fine grain size, 2, and the other with a coarse grain size, 2', using a separation selectivity adapted to said distribution of the harmful elements in order for said coarse grain size fraction to be poor in harmful elements and for said fine grain size fraction to be rich in harmful elements. The coarse grain size fraction can thus be recirculated to the stream of fumes. In the aforegoing, the terms "poor"/"rich" and "coarse"/"fine" are of only relative significance in relation to one another.

There is thus obtained, by choosing a separation selectivity permitting the treatment of streams of particles the grain sizes of which are spread over a relatively wide range, a solution permitting recycling of a part of the particles extracted, even if a large fraction of the fumes is extracted.

The desired filtration selectivity is obtained, for example, by effecting a first separation of said particles using widening of the stream of by-passed fumes, leading to the settling of said particles owing to the sudden slowing caused by the widening of the stream, and/or by subjecting said particles to electrostatic precipitation. Said coarse fraction 2' is then constituted by particles trapped during this first filtration step.

A second step of filtering the particles not trapped during the first filtration step can also be carried out, said fine fraction 2 being constituted by the particles trapped during this second filtration step.

As an operation complementary to the prior air cooling of the by-passed fumes to condense the harmful volatile elements, said by-passed fumes can be cooled a second time, before filtration, by spraying a liquid, in particular water. The temperatures of the by-passed fumes thus drop from the temperature in excess of 1000° C. obtained when they are extracted, to, for example, 400 to 600° C. before filtration, or even 120 to 250° C. in the case of a second cooling operation.

This being the case, it is possible to extract, for instance, from 5 to 55% of the fumes. By way of example, when extracting approximately 15% of the fumes of a furnace for producing cement clinker, only 60% of the chlorine will be in the fine fractions of less than 20 $\mu$m, which account for 60% of the weight of the dusts.

With this type of relatively widely spread distribution, it will be appreciated that it is necessary to limit the coarse fraction, for example, to 10 to 40% by weight of the filtered particles and that, given the existence of such fractions, it is not possible to use just any type of separating apparatus the selectivity of which is not adapted.

It is possible, for example, to isolate a coarse fraction representing 25 to 30% by weight of the particles filtered to limit the proportion of harmful elements therein to about 10 to 15% in relation to their initial content.

The invention also relates to a device for eliminating the harmful volatile elements, in particular chlorides and/or sulfates, contained in a stream of particle-laden fumes.

Such a device can be used, in particular, for implementing the process described above.

As illustrated in FIG. 1, said device includes means 3 for extracting a given fraction 1 of at least 5% of said fumes, in a stream of fumes, referred to as 'by-passed fumes', means 4 for condensing the harmful elements in the by-passed fumes at least with regard to their particles, according to a distribution that is a function of said fraction extracted, and means 5 for filtering said particles to isolate said harmful elements.

According to the invention, said filtration means 5 include means for separating said particles into at least two fractions, one with a fine grain size and the other with a coarse grain size, said separating means having a selectivity that is adapted to said distribution of the harmful elements in order for said coarse grain size fraction to be poor in harmful elements and for said fine grain size fraction to be rich in harmful elements. Furthermore, said device can include means 6 for recirculating the coarse grain size fraction to the stream of fumes 7.

Said separating means include, for example, a first filter 8, capable of receiving all of the particles of the by-passed fumes, said first filter 8 being provided with means for widening the stream of by-passed fumes and/or with means for subjecting them to electrostatic precipitation, capable of isolating said coarse fraction 2' and of directing it towards said recirculating means 6.

Said first filter 8 is constituted, in particular, by an electrostatic filter. The latter is formed, in particular, by an inlet bellmouth designed to distribute and slow down the fumes, and by a processing chamber 10, into which said inlet bellmouth 9 opens. Said processing chamber 10 permits the creation of an electrostatic field through which the fumes are caused to flow. Said first filter 8 is also provided with means 11 for extracting the trapped particles, located beneath said inlet bellmouth 9 and/or the electrostatic processing chamber 10, to collect the materials that have settled in said inlet bellmouth and/or all of the materials captured by the electrostatic field. Said means 11 for extracting coarse grain size fraction 2' come out at said recirculating means 6.

Said separating means can further include a second filter 12, capable of collecting the particles that have not been trapped in said first filter 8, and of isolating said fine grain size fraction 2. Said second filter 12 is, in particular, of the electrostatic type or of the type with textile elements. It is provided with means 13 for extracting said fine grain size fraction 2 which enable the latter to be evacuated to be disposed of or upgraded separately.

Said means 11, 13 for extracting coarse fraction 2' or fine fraction 2 are constituted, in particular, by screw or chain conveyors or any other suitable systems.

Said means 4 for condensing the harmful elements can function, in particular, with a supply of air from a source 18 in the area of means 3 for extracting the fumes.

A conditioning tower operating, in particular, by water spraying, can also be provided downstream of said extraction means 3 and upstream of said filtering means 5 along the path of the by-passed fumes to provide complementary cooling.

According to the invention, use can be made of a device described earlier in a plant for the production of cement clinker, in particular Portland cement clinker.

The invention thus relates, for example, to a process in which a pre-ground material is subjected to a heat treatment by carrying out a first, pre-heating, step and a second, heating, step giving off-particle-laden fumes and in which the fumes given off in the second step are used to provide a heat input in the first step, the harmful volatile elements contained in said fumes being treated according to the elimination process described above.

More precisely, the by-passed fumes can be extracted at the lower portion of the stream of fumes used to provide the heat input.

The corresponding cement plant includes means for carrying out a heat treatment on a pre-ground material constituted by pre-heating means, in particular a cyclone exchanger 15, and by heating means, in particular a rotary tube furnace 16, causing the giving off of fumes containing particles. Said plant further includes means for using said fumes given off by the heating means to provide a heat input at the pre-heating means, as well as a device for eliminating the harmful volatile elements present in the fumes, as described above.

Extraction means 3 of said device are located, in particular, at the base 17 of the means for using the heat energy of the fumes, between cyclone exchanger 15 and furnace 16.

Other forms of embodiment, within the grasp of a person skilled in the art, could, of course, have been contemplated without thereby departing from the scope of the invention.

What is claimed is:

1. A process for eliminating harmful volatile elements contained in a stream of particle-laden fumes comprising:

extracting a given fraction of at least 5% of the stream of the particle-laden fumes so as create by-passed fumes, said by-passed fumes containing particles therein;

condensing the particles of said by-passed fumes according to a distribution which is a function of the given fraction extracted;

filtering the particles so as to isolate harmful elements therefrom, said step of filtering comprising:

separating the particles into at least two fractions, one of the fractions having a fine grain size, another of the fraction having a course grain size, said fraction having fine grain size having a greater proportion of harmful elements than a proportion of harmful elements in said fraction having a course grain size.

2. The process of claim 1, said by-passed fumes forming a stream, said step of filtering further comprising:

widening said stream; and electrostatically precipitating the widened stream so as to trap said fraction of course grain size.

3. The process of claim 2, said step of filtering further comprising:

filtering the particles not trapped by the step of electrostatically precipitating so as to trap said fraction of fine grain size.

4. The process of claim 1, said fraction of course grain size representing 10% to 40% by weight of the particles filtered.

5. The process of claim 1, further comprising:

cooling said by-passed fumes in a pair of steps.

6. A system for eliminating harmful volatile elements contained in a stream of particle-laden fumes, the system comprising:

a means for extracting a given fraction of at least 5% of the particle-laden fumes so as to create by-passed fumes;

a means for condensing connected to said means for extracting so as to receive the by-passed fumes, said means for condensing for condensing particles from the by-passed fumes according to a distribution which is a function of the given fraction extracted; and a filtering means connected to said means for condensing so as to receive the condensed particles therefrom, said filtering means for separating the condensed particles into of least two fractions, one of the two fractions being of a fine grain size having a first proportion of harmful elements therein, another of the two fractions being of a course grain size having a second proportion of harmful elements therein, said first proportion being greater then said second proportion.

7. The system of claim 6, said filtering means comprising a first filter capable of collecting the particles from the by-passed fumes, said first filter having a means for widening a stream of the by-passed fumes.

8. The system of claim 7, said first filter comprising an electrostatic filter.

9. The system of claim 7, said filtering means further comprising a second filter capable of collecting the particles not collected by said first filter.

* * * * *